United States Patent
Messing et al.

(10) Patent No.: US 10,471,981 B2
(45) Date of Patent: Nov. 12, 2019

(54) BUCKLING CONTROL ASSEMBLY FOR A STEERING COLUMN ENERGY ABSORPTION STRAP ASSEMBLY

(71) Applicant: STEERING SOLUTIONS IP HOLDING CORPORATION, Saginaw, MI (US)

(72) Inventors: Nicholas M. Messing, Freeland, MI (US); Benjamin D. Reichard, Saginaw, MI (US); Matthew J-T Vincent, Saginaw, MI (US); Robert Dubay, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 111 days.

(21) Appl. No.: 15/720,315

(22) Filed: Sep. 29, 2017

(65) Prior Publication Data
US 2019/0100230 A1   Apr. 4, 2019

(51) Int. Cl.
*B62D 1/19*   (2006.01)
*F16F 7/12*   (2006.01)

(52) U.S. Cl.
CPC .............. *B62D 1/192* (2013.01); *B62D 1/195* (2013.01); *F16F 7/123* (2013.01)

(58) Field of Classification Search
CPC .......... B62D 1/192; B62D 1/195; F16F 7/123
See application file for complete search history.

(56) References Cited

U.S. PATENT DOCUMENTS

| | | | | |
|---|---|---|---|---|
| 4,630,716 A | * | 12/1986 | Faust | F16F 7/123 188/371 |
| 4,838,576 A | * | 6/1989 | Hamasaki | B62D 1/195 188/372 |
| 6,170,873 B1 | * | 1/2001 | Jurik | B62D 1/195 188/371 |
| 2003/0042723 A1 | * | 3/2003 | Riefe | B62D 1/195 280/777 |
| 2003/0071451 A1 | * | 4/2003 | Riefe | B62D 1/195 280/777 |
| 2004/0217581 A1 | * | 11/2004 | Dubay | B62D 1/195 280/777 |
| 2005/0093285 A1 | * | 5/2005 | Lee | B60R 21/09 280/779 |

(Continued)

FOREIGN PATENT DOCUMENTS

| | | | | |
|---|---|---|---|---|
| EP | 1479593 A1 | * | 11/2004 | ............. B62D 1/195 |
| EP | 1728703 A2 | * | 12/2006 | ............. B62D 1/195 |

(Continued)

*Primary Examiner* — Ruth Ilan

(57) ABSTRACT

A buckling control assembly for a steering column energy absorption strap assembly is provided. The buckling control assembly includes an inner energy absorption strap operatively coupled to a steering column jacket. Also included is an outer energy absorption strap surrounding at least a portion of the inner energy absorption strap and operatively coupled to the steering column jacket. Further included is a strap constraining structure disposed on a constraint side of the outer energy absorption strap to inhibit buckling of the outer energy absorption strap in a first direction, the outer energy absorption strap having a free side unconstrained to accommodate buckling of the outer energy absorption strap.

10 Claims, 4 Drawing Sheets

(56) References Cited

U.S. PATENT DOCUMENTS

| | | | | |
|---|---|---|---|---|
| 2005/0248141 A1* | 11/2005 | Manwaring | ............ | B62D 1/195 |
| | | | | 280/777 |
| 2007/0194563 A1* | 8/2007 | Menjak | ................. | B62D 1/195 |
| | | | | 280/777 |
| 2007/0228716 A1* | 10/2007 | Menjak | ................. | B62D 1/192 |
| | | | | 280/777 |
| 2009/0033082 A1* | 2/2009 | Klukowski | ............ | B62D 1/195 |
| | | | | 280/777 |
| 2016/0046318 A1* | 2/2016 | Stinebring | ............. | B62D 1/181 |
| | | | | 74/493 |

FOREIGN PATENT DOCUMENTS

| | | | | | | |
|---|---|---|---|---|---|---|
| EP | | 3075632 | B1 | * | 2/2018 | |
| GB | | 2291840 | A | * | 2/1996 | ............. B62D 1/195 |

* cited by examiner

BUCKLING CONTROL ASSEMBLY FOR A STEERING COLUMN ENERGY ABSORPTION STRAP ASSEMBLY

FIELD OF INVENTION

The embodiments disclosed herein relate to vehicle steering column assemblies and, more particularly, to a buckling control assembly for a steering column energy absorption strap assembly.

BACKGROUND OF INVENTION

On adjustable steering columns, energy absorption straps are utilized to partially reduce an occupant's kinetic energy during a collapse event of the steering column. Some steering columns include multiple energy absorbing straps to have a constant running load during a collapse event. Such straps may include one strap that is nested within the other strap. Prior efforts utilize an outer energy absorption strap that is fully captured on either side of the outer strap for the entire length of the collapse event, such as the generically shown design in FIG. 1. During the collapse event, either or both straps buckle because of the design properties of the strap(s). During the bucking action, the straps can bind against one another due to the lack of freedom caused by the outer strap being completely captured. The binding of the strap, or straps, undesirably results in an inconsistent running load performance.

SUMMARY OF INVENTION

According to one aspect of the disclosure, a buckling control assembly for a steering column energy absorption strap assembly is provided. The buckling control assembly includes an inner energy absorption strap operatively coupled to a steering column jacket. Also included is an outer energy absorption strap surrounding at least a portion of the inner energy absorption strap and operatively coupled to the steering column jacket. Further included is a strap constraining structure disposed on a constraint side of the outer energy absorption strap to inhibit buckling of the outer energy absorption strap in a first direction, the outer energy absorption strap having a free side unconstrained to accommodate buckling of the outer energy absorption strap.

According to another aspect of the disclosure, a steering column assembly includes an upper jacket. Also included is a lower jacket, the upper jacket and the lower jacket telescoping moveable relative to each other during a collapse event. Further included is an energy absorption strap assembly for managing energy absorption during the collapse event. The energy absorption strap assembly includes an inner energy absorption strap operatively coupled to the upper jacket, the inner energy absorption strap being U-shaped, the inner energy absorption strap including a first side portion, a second side portion, and a bend portion joining the first and second side portions. The energy absorption strap also includes an outer energy absorption strap surrounding at least a portion of the inner energy absorption strap and operatively coupled to the upper jacket, the outer energy absorption strap including a first side portion, a second side portion, and a bend portion joining the first and second side portions. The energy absorption strap further includes a strap constraining structure disposed on a constraint side of the outer energy absorption strap to inhibit buckling of the outer energy absorption strap in a first direction, the outer energy absorption strap having a free side unconstrained to accommodate buckling of the outer energy absorption strap.

BRIEF DESCRIPTION OF DRAWINGS

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Referring now to the Figures, wherein like numerals indicate corresponding parts, the subject invention is described below with reference to specific non-limiting embodiments thereof. The embodiments described herein relate to a buckling control assembly for an energy absorption strap assembly associated with a steering column (also referred to herein as a "steering column assembly"). The steering column may be utilized in numerous types of vehicles.

Figure 2:
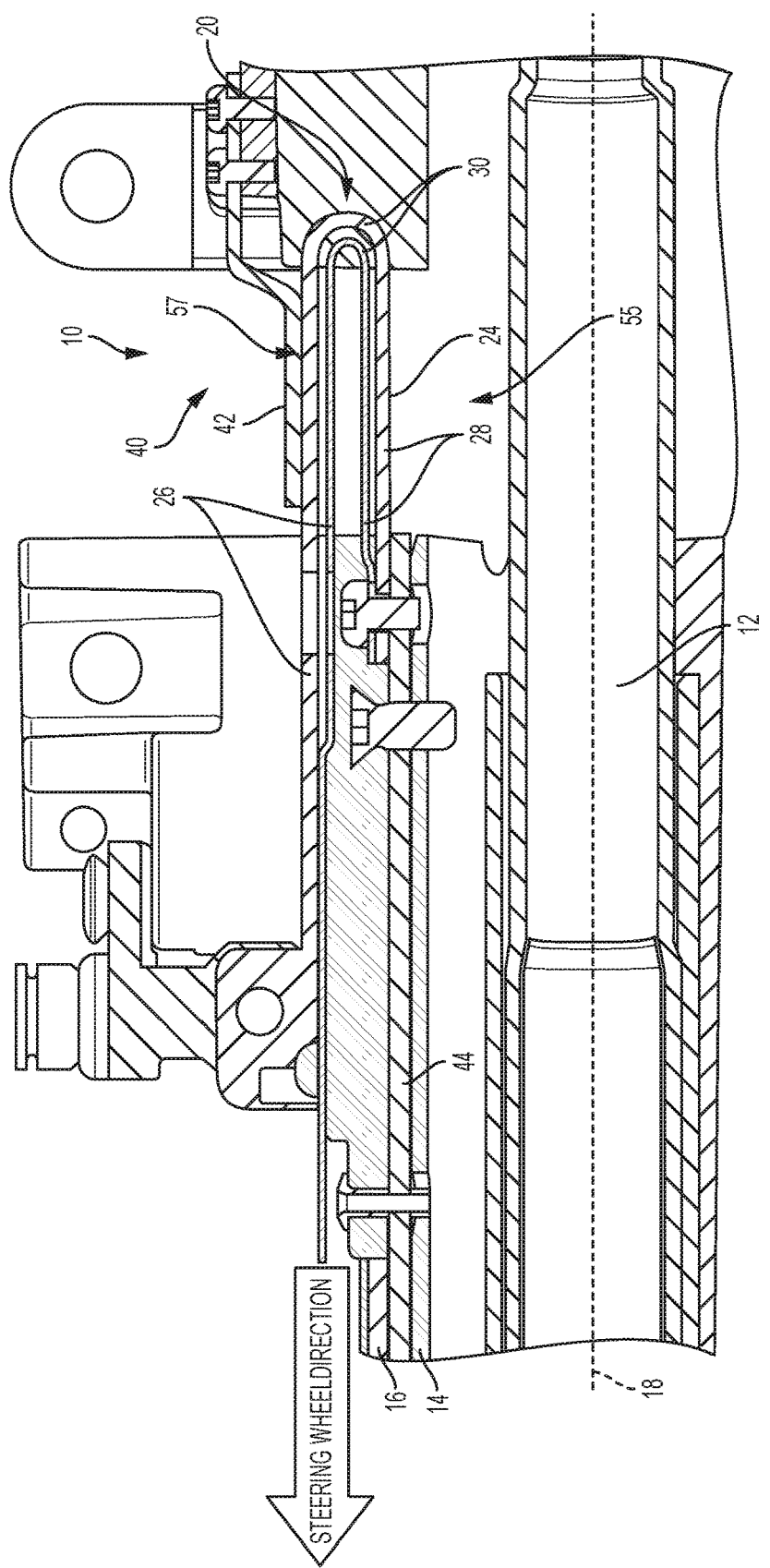
FIG. 2 is an elevational, partial cross-sectional view of a steering column assembly with an energy absorption strap assembly.

Referring to FIG. 2, the steering column is illustrated and generally referenced with numeral 10. The steering column 10 substantially extends along a longitudinal axis "A." The steering column 10 is adjustable in a telescopic direction parallel to the longitudinal axis "A" (i.e., the steering column 10 is axially adjustable along the longitudinal axis "A"). More specifically, the steering column includes a steering shaft 12 rotatably disposed within a column assembly that includes an upper jacket 14 and a lower jacket 16. The steering shaft 12 may be one of a plurality of operatively coupled steering shafts in some embodiments. A steering wheel (not shown) is configured to be mounted to the steering shaft 12. The column jackets 14, 16 and the steering shaft 12 substantially extend along the longitudinal axis "A." The upper jacket 14 is movable, relative to the lower jacket 16, during a normal operating condition of the vehicle to telescopically adjust a position of the steering wheel along the longitudinal axis "A." The normal operating condition (also referred to herein as a first condition of the steering column) is defined as a normal driving condition that allows adjustment of the upper jacket 14 over a predefined range of telescoping movement that is suitable for driving.

The steering column 10 is also operable in a second operating condition defined as a collapse of the upper jacket 14 during an energy absorption event. In this way, energy-absorbing movement (i.e., energy absorbing collapsibility) of the upper jacket 14 along the longitudinal axis "A" within the lower jacket 16 is provided. To assist with a collapse event and to provide desirable characteristics during the normal operating condition, an energy absorption strap assembly is provided, as described herein. The energy absorption strap assembly is generally referenced with numeral 20.

The energy absorption strap assembly 20 includes multiple energy absorption (EA) straps arranged in what is referred to as a "nested" arrangement. In the illustrated example, a first energy absorption strap 22 (first EA strap 22) and a second energy absorption strap 24 (second EA strap 24) are included. Both the first and second EA straps 22, 24 are substantially U-shaped in some embodiments. In particular, each EA strap 22, 24 includes a first side portion 26, a second side portion 28, and a bend portion 30 joining the first and second side portion 26, 28 of each respective EA strap 22, 24. The nested arrangement of the EA straps 22, 24 refers to the first EA strap 22 being an inner EA strap that is at least partially surrounded by the second EA strap 24, which is an outer EA strap. As shown, at least the end portion (i.e., the bend portion 30) of the first EA strap 22 is surrounded by the second EA strap 24. In this configuration, the first side portion 26 of the second EA strap 24 is positioned radially outward of the first side portion 26 of the first EA strap 22. Similarly, the second side portion 28 of the second EA strap 24 is positioned radially inward of the second side portion 28 of the first EA strap 22. The radial positioning is relative to a central axis of the steering column, which is described above as axis A.

The EA straps 22, 24 are each operatively coupled to the upper jacket 14. The EA straps 22, 24 each absorb energy during a collapse event of the steering column 10. Respective mechanisms engage the EA straps 22, 24 to maintain the straps in an active condition that absorbs energy during a collapse event. In some embodiments, the energy absorption strap assembly 20 may be selectively switched between multiple load requirements. For example, when a lower energy absorption load is required, only one of the EA straps is required to be engaged. In some embodiments, a high load is rated for absorption of a force ranging from about 8,000 N to about 10,000 N. In some embodiments, a low load is rated for absorption of a force ranging from about 3,000 N to about 5,000 N. The EA straps 22, 24 may be positioned at any location around the steering column 10, such as on sides of the column, as well as on an upper or lower portion of the column.

A buckling control assembly generally referenced with numeral 40 is provided to avoid binding of the two EA straps 22, 24 if buckling occurs during a collapse event. The buckling control assembly includes a first strap constraining structure 42 disposed on a constraint side of the second EA strap 24 (outer EA strap) proximate the bend portion 30 of the second EA strap 24. The constraint side is generally referenced with numeral 57. In some embodiments, the first strap constraining structure 42 extends along only a portion of the constraint side of the second EA strap 24, but in other embodiments, the first strap constraining structure 42 extends along an entirety of the constraint side of the second EA strap 24. The constraint side of the second EA strap 24 is illustrated as being radially outward of the first side portion 26 of the second EA strap 24, but it is to be appreciated that the constraint side may be located radially inward of the second side portion 28 of the second EA strap 24. The first strap constraining structure 42 may be disposed in contact with the second EA strap 24 or with a clearance therebetween.

Figure 1:
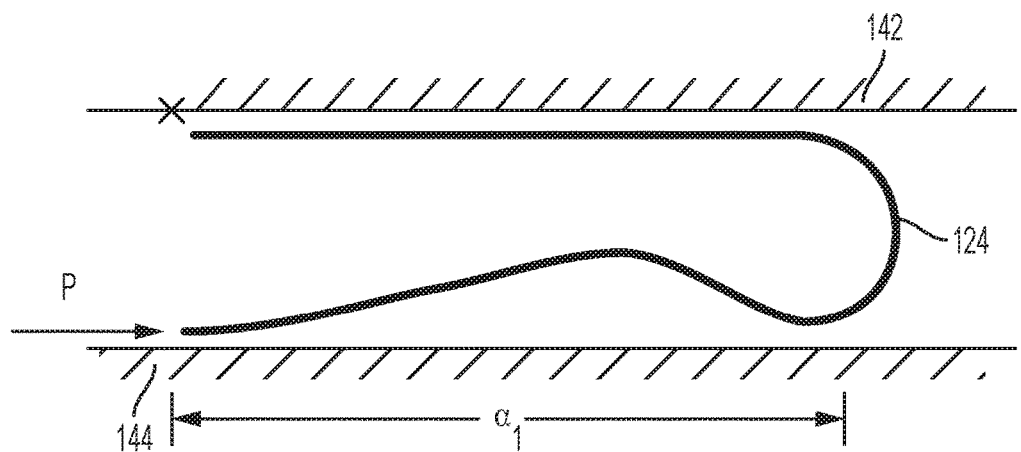
FIG. 1 is an energy absorption strap assembly known in the art.

Referring to FIGS. 1 and 2, regardless of which side of the second EA strap 24 the first strap constraining structure 42 is located, it is located proximate the bend portion 30 of the second EA strap 24 to inhibit the second EA strap 24 from buckling in that direction during a collapse event. The other side of the second EA strap 24 is referred to as a free side of the second EA strap 24. The free side is generally referenced with numeral 55 and is an unconstrained side of the second EA strap 24 to accommodate movement of the EA straps 22, 24 in that direction if buckling occurs during a collapse event, as shown in FIG. 2. A second strap constraining structure 44 is present in some embodiments, but if present only extends partially along a length of the second EA strap 24 and is not present proximate the bend portion 30 of the second EA strap 24, as shown in FIG. 2.

FIG. 2 illustrates a buckling occurrence during a collapse event, as described above. Buckling of the first EA strap 22 is not trapped rigidly within the second EA strap 24, thereby avoiding binding of the EA strap 22, 24. Conversely, an embodiment having an outer EA strap 124 fully constrained on both sides by strap restraining structures 142, 144, as done in FIG. 1, does not allow movement of an outer EA strap during buckling, undesirably resulting in binding of the EA straps.

Figure 4:
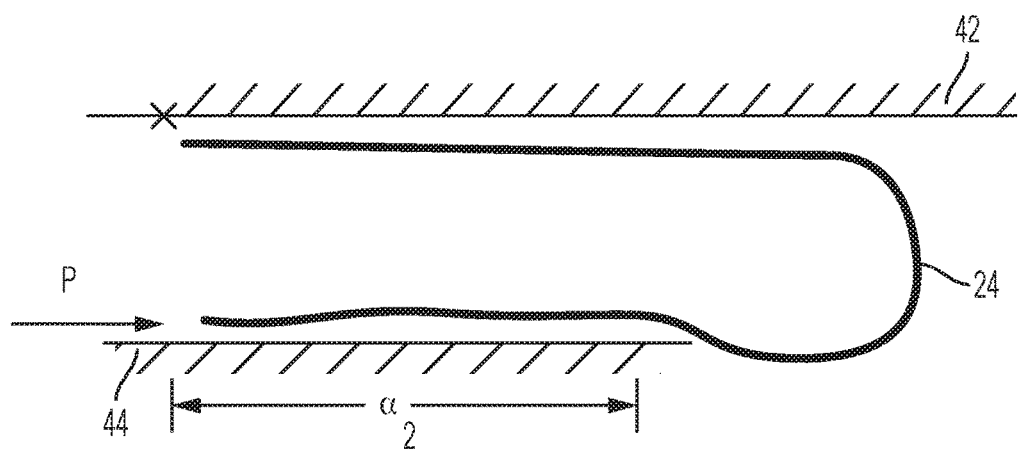
FIG. 4 is a schematic view of the energy absorption strap assembly of FIG. 3.
Figure 3A:
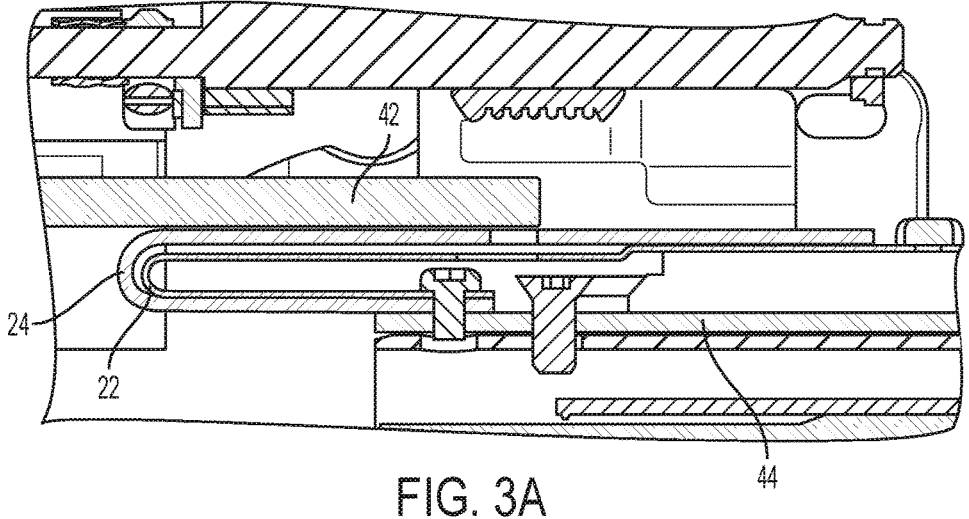
FIG. 3 is an elevational, partial cross-sectional view illustrating the energy absorption strap assembly.
Figure 3B:
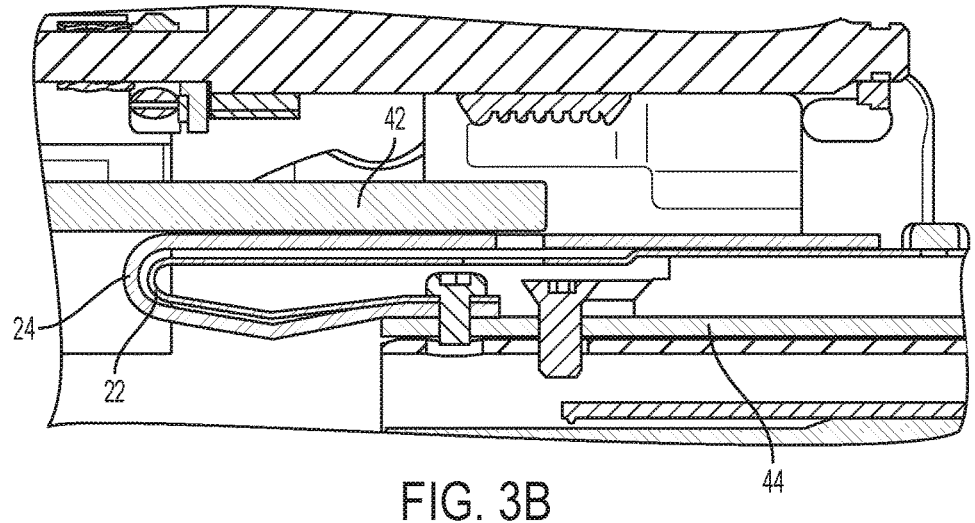

Referring now to FIGS. 1 and 4, schematic illustrations of the EA straps of FIG. 2 and of the prior art embodiment of FIG. 1 are shown. The prior art embodiment of FIG. 1 illustrates a fully constrained EA strap 124, with a constrained length of $L_1$, with a force applied during a collapse event as $P_1$. The embodiments of the present disclosure illustrated in FIGS. 2 and 3 are represented in FIG. 4. In particular, the partially constrained EA strap 24 is shown with a constrained length of $L_2$, with a force applied during a collapse event as $P_2$.

The critical buckling force of each embodiment may be found by utilization of Euler's Column Formula:

$$P_C = K(\alpha^2 EI/L)$$

where K is a numerical coefficient whose value depends on the end conditions and intermediate supports, E is the modulus of elasticity, I is the moment of intertia, and L is the length of the column constrained.

Given an identical strap size and material, only L is changed in the formula. Therefore, a ratio of the fully constrained buckling force to the partially constrained buckling force is represented by $P_{C1}/P_{C2}$ and equals $(L_2/L_1)^2$. As the constraint length increases, the critical buckling force is lowered. Therefore, the embodiments of FIGS. 2-4 provide a higher critical buckling force and avoid binding of the EA straps 22, 24, when compared to the embodiment of FIG. 1.

Figure 5:
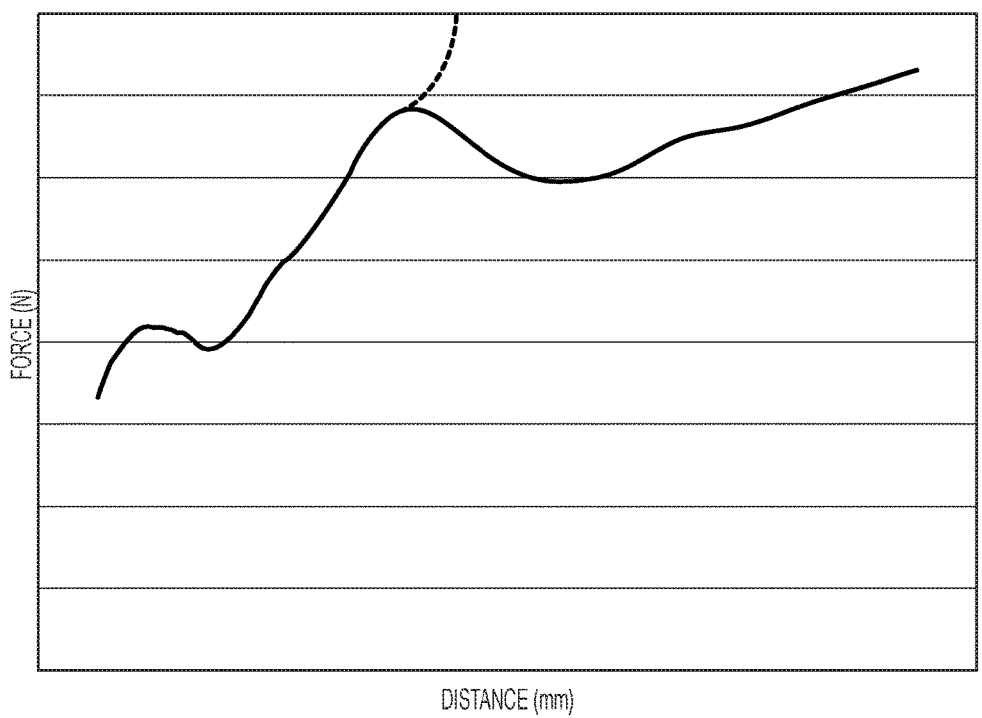
FIG. 5 is a plot of load against displacement of two energy absorption strap assemblies.

FIG. 5 is a plot of load vs. displacement. In particular, the plot compares the EA strap assembly 20 of FIGS. 2-4 against a fully constrained EA strap assembly, such as that illustrated in FIG. 1. As shown, the prior assembly of FIG. 1 buckles at a low load and the force increases due to binding at the buckling displacement location. In contrast, the EA strap assembly 20 disclosed herein provides a smooth load path over a larger displacement range.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

The invention claimed is:

1. A buckling control assembly for a steering column energy absorption strap assembly, the buckling control assembly comprising:
    an inner energy absorption strap operatively coupled to a steering column jacket;
    an outer energy absorption strap surrounding at least a portion of the inner energy absorption strap and operatively coupled to the steering column jacket; and
    a strap constraining structure disposed on a constraint side of the outer energy absorption strap to inhibit buckling of the outer energy absorption strap in a first direction, the outer energy absorption strap having a free side unconstrained to accommodate buckling of the outer energy absorption strap, the strap constraining structure having a step region connecting a first strap constraining structure segment and a second strap constraining structure segment, wherein the first strap constraining structure segment is located radially closer to the constraint side of the outer energy absorption strap compared to the radial distance between the second strap constraining structure segment and the constraint side of the outer energy absorption strap.

2. The buckling control assembly of claim 1, wherein the inner energy absorption strap and the outer energy absorption strap are each U-shaped, each strap comprising a first side portion, a second side portion, and a bend portion joining the first and second side portions.

3. The buckling control assembly of claim 2, wherein the constraint side of the outer energy absorption strap is a radially outward side of the first side portion and the free side of the outer energy absorption strap is a radially inward side of the second side portion, the radially outward side and the radially inward side being relative to a central axis of the steering column jacket.

4. The buckling control assembly of claim 2, wherein the constraint side of the outer energy absorption strap is a radially inward side of the second side portion and the free side of the outer energy absorption strap is a radially outward side of the first side portion, the radially outward side and the radially inward side being relative to a central axis of the steering column jacket.

5. The buckling control assembly of claim 1, wherein the strap constraining structure is located proximate an end region of the outer energy absorption strap.

6. The buckling control assembly of claim 2, wherein the strap constraining structure is located proximate the bend portion of the outer energy absorption strap.

7. A steering column assembly comprising:
    an upper jacket;
    a lower jacket, the upper jacket and the lower jacket telescoping moveable relative to each other during a collapse event; and
    an energy absorption strap assembly for managing energy absorption during the collapse event, the energy absorption strap assembly comprising:
        an inner energy absorption strap operatively coupled to the upper jacket, the inner energy absorption strap being U-shaped, the inner energy absorption strap including a first side portion, a second side portion, and a bend portion joining the first and second side portions;
        an outer energy absorption strap surrounding at least a portion of the inner energy absorption strap and operatively coupled to the upper jacket, the outer energy absorption strap including a first side portion, a second side portion, and a bend portion joining the first and second side portions; and
        a strap constraining structure disposed on a constraint side of the outer energy absorption strap to inhibit buckling of the outer energy absorption strap in a first direction, the outer energy absorption strap having a free side unconstrained to accommodate buckling of the outer energy absorption strap, the strap constraining structure having a step region connecting a first strap constraining structure segment and a second strap constraining structure segment, wherein the first strap constraining structure segment is located radially closer to the constraint side of the outer energy absorption strap compared to the radial distance between the second strap constraining structure segment and the constraint side of the outer energy absorption strap.

8. The steering column assembly of claim 7, wherein the constraint side of the outer energy absorption strap is a radially outward side of the first side portion and the free side of the outer energy absorption strap is a radially inward side of the second side portion, the radially outward side and the radially inward side being relative to a central axis of the steering column jacket.

9. The steering column assembly of claim 7, wherein the constraint side of the outer energy absorption strap is a radially inward side of the second side portion and the free side of the outer energy absorption strap is a radially outward side of the first side portion, the radially outward side and the radially inward side being relative to a central axis of the steering column jacket.

10. The steering column assembly of claim 7, wherein the strap constraining structure is located proximate the bend portion of the outer energy absorption strap.

* * * * *